(12) United States Patent
Na et al.

(10) Patent No.: US 10,854,379 B2
(45) Date of Patent: Dec. 1, 2020

(54) WIRELESS POWER TRANSFER ANTENNA CORE AND WIRELESS POWER TRANSFER MODULE INCLUDING SAME

(71) Applicant: AMOSENSE CO., LTD, Cheonan-si (KR)

(72) Inventors: Won San Na, Seoul (KR); Byoung Su Jin, Suwon-si (KR); Do Sick Kim, Goyang-si (KR); Bo Hyeon Han, Goyang-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 21 days.

(21) Appl. No.: 16/339,150

(22) PCT Filed: Sep. 28, 2017

(86) PCT No.: PCT/KR2017/010835
§ 371 (c)(1),
(2) Date: Apr. 3, 2019

(87) PCT Pub. No.: WO2018/066894
PCT Pub. Date: Dec. 4, 2018

(65) Prior Publication Data
US 2019/0228907 A1    Jul. 25, 2019

(30) Foreign Application Priority Data
Oct. 7, 2016    (KR) .......................... 10-2016-0130127

(51) Int. Cl.
*H01Q 7/08*    (2006.01)
*H01F 38/14*    (2006.01)
(Continued)

(52) U.S. Cl.
CPC ............... *H01F 38/14* (2013.01); *H01F 3/00* (2013.01); *H01F 27/24* (2013.01); *H01Q 3/01* (2013.01);
(Continued)

(58) Field of Classification Search
CPC . H01F 38/14; H01F 3/00; H01F 27/24; H01F 3/04; H01F 3/08; H01F 5/00;
(Continued)

(56) References Cited

U.S. PATENT DOCUMENTS 7,463,208 B2 * 12/2008 Araki ........................ H01Q 7/08
   343/718
10,256,031 B2 * 4/2019 Baker ................. H01F 27/2823
(Continued)

FOREIGN PATENT DOCUMENTS

JP    2011050127 A    3/2011
JP    2013084652 A    5/2013
(Continued)

*Primary Examiner* — Dinh T Le
(74) *Attorney, Agent, or Firm* — Rothwell, Figg, Ernst & Manbeck, P.C.

(57) ABSTRACT

Provided is a wireless power transfer antenna core. In the wireless power transfer antenna core according to an exemplary embodiment of the present invention, a conductive member configured to serve as an antenna for transmitting or receiving wireless power is wound multiple times along a longitudinal direction. The wireless power transfer antenna core is made of a magnetic body and comprises: a first portion having a first cross-sectional area; and a second portion extending with a predetermined length from an end of the first portion and second cross-sectional area that is relatively larger than the first cross-sectional area, wherein the conductive member is wound multiple times on the first portion.

9 Claims, 8 Drawing Sheets

(51) Int. Cl.
| | | |
|---|---|---|
| *H01F 27/24* | (2006.01) | |
| *H04B 5/00* | (2006.01) | |
| *H02J 50/12* | (2016.01) | |
| *H02J 7/02* | (2016.01) | |
| *H01F 3/00* | (2006.01) | |
| *H01Q 3/01* | (2006.01) | |
| *H01F 5/00* | (2006.01) | |
| *H01F 3/04* | (2006.01) | |
| *H01F 3/08* | (2006.01) | |

(52) U.S. Cl.
CPC ............... *H01Q 7/08* (2013.01); *H02J 7/025* (2013.01); *H02J 50/12* (2016.02); *H04B 5/0037* (2013.01); *H04B 5/0081* (2013.01); *H01F 3/04* (2013.01); *H01F 3/08* (2013.01); *H01F 5/00* (2013.01)

(58) Field of Classification Search
CPC ........ H02J 50/12; H02J 7/025; H04B 5/0037; H04B 5/0081; H01Q 7/08; H01Q 3/01
See application file for complete search history.

(56) References Cited

U.S. PATENT DOCUMENTS

| | | | |
|---|---|---|---|
| 2007/0120758 A1* | 5/2007 | Takahashi | G04G 21/04 |
| | | | 343/788 |
| 2011/0291904 A1* | 12/2011 | Conway | H01Q 7/08 |
| | | | 343/788 |

FOREIGN PATENT DOCUMENTS

| | | |
|---|---|---|
| JP | 2013126008 A | 6/2013 |
| JP | 2014197927 A | 10/2014 |
| KR | 1020110014714 A | 2/2011 |
| KR | 1020140004169 A | 1/2014 |
| KR | 1020140090045 A | 7/2014 |
| KR | 1020160037650 A | 4/2016 |

* cited by examiner

WIRELESS POWER TRANSFER ANTENNA CORE AND WIRELESS POWER TRANSFER MODULE INCLUDING SAME

CROSS REFERENCE TO RELATED APPLICATIONS

This application is the national phase entry of International Application No. PCT/KR2017/010835, filed on Sep. 27, 2017, which is based upon and claims priority to Korean Patent Applications 10-2016-0130127, filed on Oct. 7, 2016. The entire contents of which are incorporated herein by reference.

FIELD OF THE INVENTION

The present invention relates to a wireless power transfer antenna core and a wireless power transfer module including the same.

BACKGROUND

As wireless power transmission technology is applied to portable electronic devices such as mobile phones, personal digital assistants (PDAs), notebooks, and tablet personal computers (PCs), the wireless power transmission technology is newly emerging. Such wireless power transmission technology is a technology for transmitting power in wireless to portable electronic devices without using a wired cable.

Recently, wireless power is supplied to home appliances such as televisions (TVs), cleaners, and the like, or wireless home appliances driven using the supplied wireless power are getting attention. Since the wireless home appliance does not require a power supply line, even when the wireless home appliance is installed at a specific position, a clean appearance can be produced so that an aesthetically pleasing feeling for an interior can be improved.

In addition, since wireless home appliances do not require a power supply line, the appliances can be free from selecting an installation location where they should be installed adjacent to an outlet considering a length of the power supply line. In particular, when the length of the power supply line is freed, a movable home appliance such as a cleaner can have very improved usability because a travel distance of the movable home appliance is not limited.

As an example of such wireless power transmission technology, there is a magnetic resonance method in which a magnetic field is generated so as to allow resonance to occur between a transmitting coil and a receiving coil in a predetermined frequency band, thereby transmitting wireless power. A power transmission distance of the magnetic resonance method is directly affected according to how much a magnetic field can be generated between the transmitting coil and the receiving coil.

Recently, a wireless power receiving module and a wireless power transmitting module have been implemented in the form of a solenoid in which a coil is wound along an outer circumferential surface of an antenna core composed of a magnetic body so as to generate a large magnetic field between the transmitting coil and the receiving coil.

However, in the general wireless power receiving module and the wireless power transmitting module which are each implemented in the form of a solenoid, an antenna core formed to have the same thickness over the entire length thereof is disposed in a coil functioning as a wireless power transfer antenna.

Consequently, since the coil wound on the antenna core inevitably protrudes from a surface of the antenna core, there is a limitation in which the overall thickness becomes thick to correspond to the thickness of the coil. Therefore, there are problems in that the overall thickness becomes thick and thus space utilization is limited, and transmission efficiency is lower as compared with a magnetic induction method.

SUMMARY OF THE INVENTION

The present invention is directed to providing a wireless power transfer antenna core capable of more shortening a distance between a receiving antenna core and a transfer antenna core without increasing the overall size when the wireless power transfer antenna core is implemented as a wireless power transmitting module by forming an antenna core so as to allow a cross-sectional area of a portion on which a conductive member functioning as a wireless power transfer antenna is not wound to be relatively greater than a cross-sectional area of a portion on which the conductive member is wound, and a wireless power transfer module including the same.

One aspect of the present invention provides a wireless power transfer antenna core in which a conductive member configured to serve as an antenna for transmitting or receiving wireless power is wound multiple times along a longitudinal direction, wherein the wireless power transfer antenna core includes, a first portion having a first cross-sectional area, and a second portion extending with a predetermined length from an end portion of the first portion and having a second cross-sectional area that is relatively larger than the first cross-sectional area, wherein the wireless power transfer core is made of a magnetic body having a predetermined length and the conductive member is wound multiple times on the first portion.

Each of the first portion and the second portion may have any one cross-sectional shape among a circular shape, a polygonal shape, an elliptical shape, an arc shape, and a combination thereof.

The second portion may be formed to extend from both end portions of the first portion.

A central axis of the first portion and a central axis of the second portion may be connected to be aligned with each other in the longitudinal direction of the wireless power transfer antenna core. In this case, the second portion may be formed to allow a thickness protruding from an outer surface of the first portion in a direction perpendicular to the central axis to be equal to or thicker than a line diameter of the conductive member.

The second portion may be connected to the first portion such that the central axis of the second portion is offset with respect to the central axis of the first portion.

The magnetic body may include any one of a ferrite, a polymer and a ribbon sheet including at least of an amorphous alloy and a nanocrystalline alloy.

An insulating layer may be formed on an outer surface of the wireless power transfer antenna core.

The conductive member may be wound on an entire length of the first portion or on a partial length thereof.

Another aspect of the present invention provides a wireless power transfer module including the above-described wireless power transfer antenna core, and a wireless power transfer antenna in which a conductive member having a predetermined line diameter is wound along a circumference of the first portion in a longitudinal direction so as to serve as an antenna for transmitting or receiving wireless power, wherein the wireless power transfer module may serve as a wireless power receiving module or a wireless power transmitting module.

In accordance with the present invention, an antenna core is configured such that both sides of a portion, on which a conductive member functioning as a wireless power transfer antenna is wound, are each formed to have a relative wide cross-sectional area than other portions. Consequently, it is possible to increase a coupling coefficient between a wireless power receiving antenna and a wireless power transfer antenna, thereby improving transmission efficiency of wireless power.

DETAILED DESCRIPTION OF THE INVENTION

Hereinafter, embodiments of the present invention will be fully described in detail which is suitable for easy implementation by those skilled in the art to which the present invention pertains with reference to the accompanying drawings. The present invention may be implemented in various different forms, and thus it is not limited to embodiments which will be described herein. In the drawings, some portions not related to the description will be omitted in order to clearly describe the present invention, and the same or similar reference numerals are given to the same or similar components throughout this disclosure.

Figure 5:
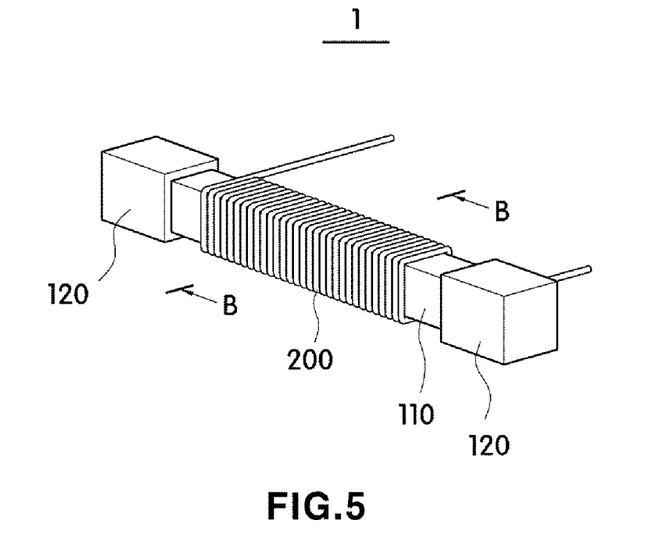
FIG. 5 is a schematic diagram illustrating a wireless power transfer module including the wireless power transfer antenna core according to one embodiment of the present invention.
Figure 6:
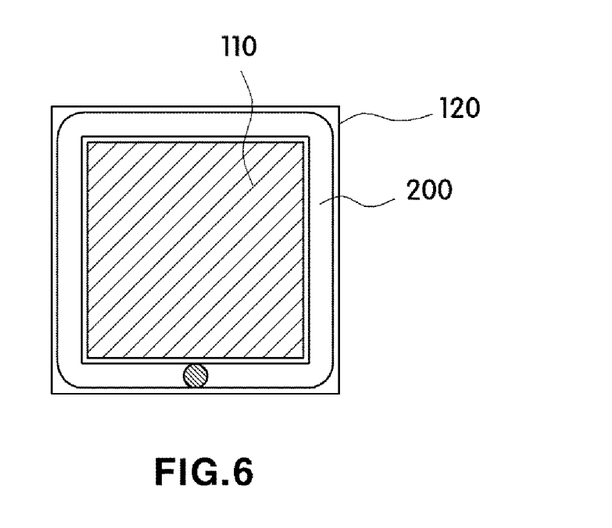
FIG. 6 is a cross-sectional view taken along line B-B of FIG. 5.

As shown in FIGS. 5 and 6, a wireless power transfer antenna core 100 according to one embodiment of the present invention may be configured such that the conductive member 200 serving as a wireless power transfer antenna may be wound a plurality of times along the outer surface of wireless power transfer antenna core 100. Accordingly, a wireless power transfer antenna core 100 according to one embodiment of the present invention may be implemented as a solenoid-type wireless power transfer module 1 capable of transmitting or receiving wireless power.

That is, the wireless power transfer antenna core 100 may be formed of a magnetic body having a predetermined length and may be disposed in the conductive member 200 that is wound multiple times in a coil shape to serve as a wireless power transfer antenna.

Accordingly, the wireless power transfer antenna core 100 may improve a degree of focusing a magnetic field induced to the conductive member 200 while entirely supporting the conductive member 200 that is wound multiple times along a longitudinal direction.

For example, the magnetic body may be any one of a polymer, a ferrite and a ribbon sheet including at least one of an amorphous alloy and a nanocrystalline alloy, and the ferrite may be Ni—Zn or Mn—Zn ferrite. However, it is noted that a sort of the magnetic body is not limited thereto, and any known magnetic body usable as the antenna core may be employed.

In this case, the wireless power transfer antenna core 100 according to one embodiment of the present invention may be formed such that a partial length of the entire length of the wireless power transfer antenna core 100 has a cross-sectional area that is relatively larger than that of the remaining length thereof.

Figure 1:
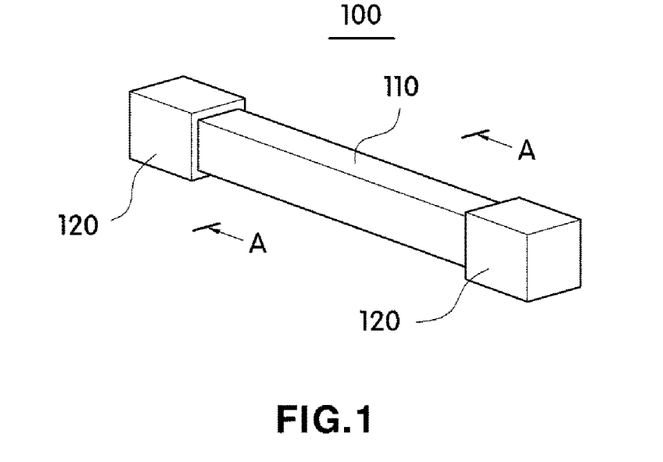
FIG. 1 is a schematic diagram illustrating a wireless power transfer antenna core according to one embodiment of the present invention.
Figure 2:
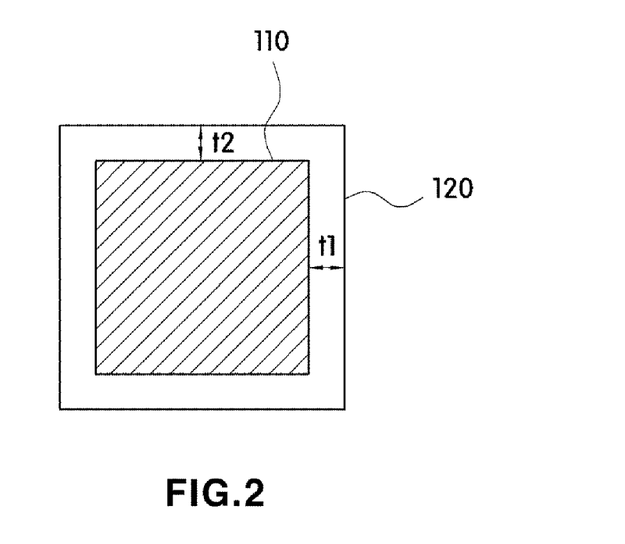
FIG. 2 is a cross-sectional view taken along line A-A of FIG. 1.

For example, as shown in FIGS. 1 and 2, the wireless power transfer antenna core 100 may include a first portion 110 having a relatively narrow first cross-sectional area of the entire length and a second portion 120 having a second cross-sectional area that is relatively wider than that of the first portion 110, and the conductive member 200 may be wound on the first portion 110 having the relatively narrow first cross-sectional area.

Specifically, the second portion 120, having the second cross-sectional area that is relatively wider than that of the first portion 110, may extend with a predetermined length from end portions of the first portion 110 and each of the second portions may be formed at the both end portions of the first portion 110.

In the present invention, the conductive member 200 may be wound along the entire length of the first portion 110 or along only a partial length of the entire length of the first portion 110.

Figure 3:
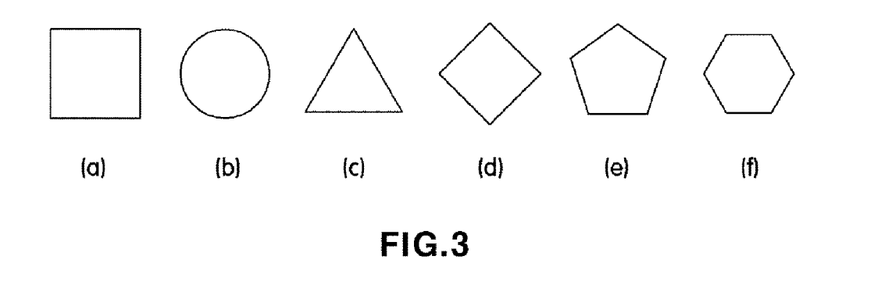
FIG. 3 is a cross-sectional view illustrating various shapes of a first portion and a second portion which are applied to the wireless power transfer antenna core according to one embodiment of the present invention.

Further, as shown in FIG. 3, the first portion 110 and the second portion 120 having different cross-sectional areas may each have a cross-sectional shape among a circular shape, a polygonal shape, an elliptical shape, an arc shape, and a combination thereof.

Figure 4:
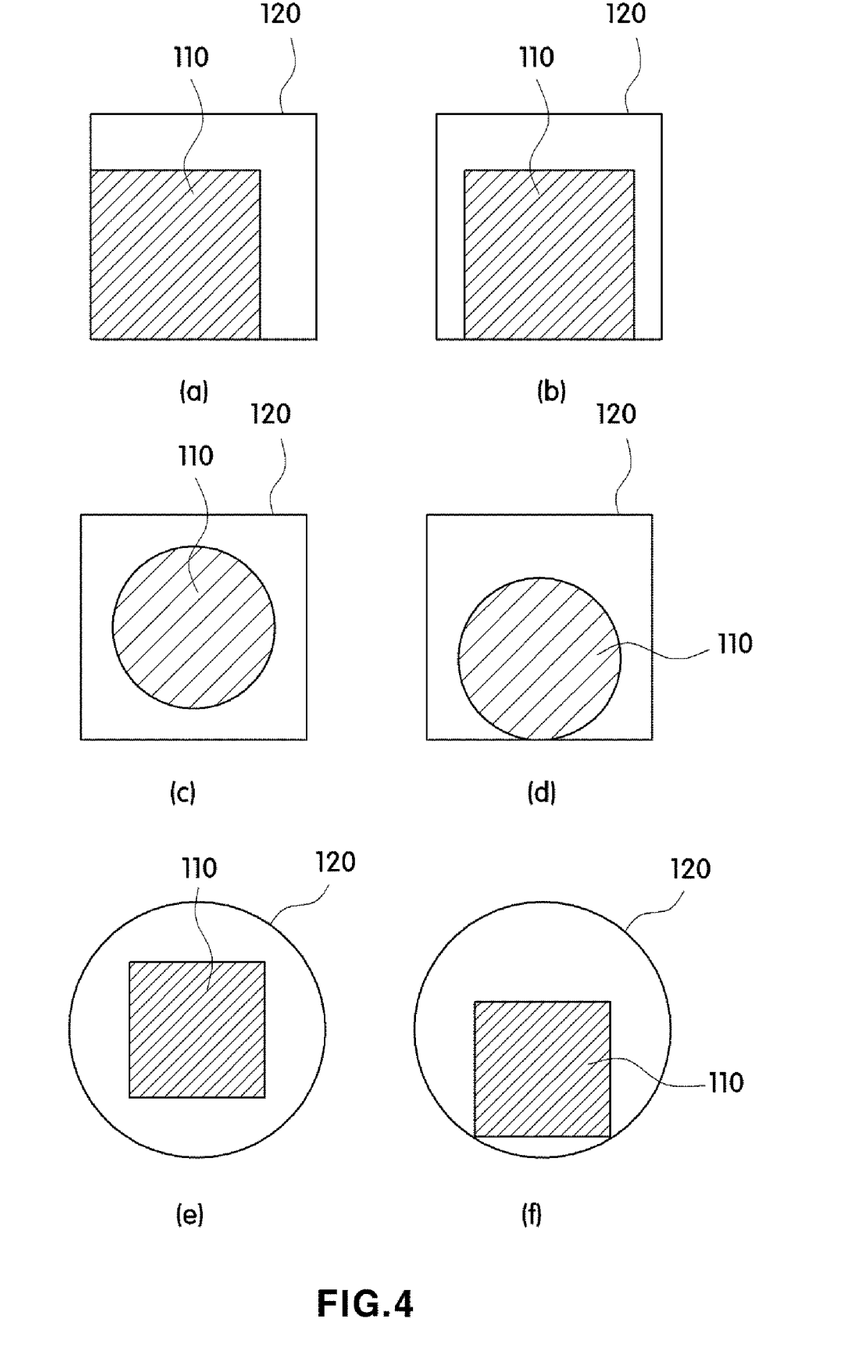
FIG. 4 is a cross-sectional view illustrating various arrangement relationships between the first portion and the second portion which are applied to the wireless power transfer antenna core according to one embodiment of the present invention.

Furthermore, as shown in FIG. 4, the first portion 110 and the second portion 120 may have the same cross-sectional shape or different cross-sectional shapes.

Thus, as shown in FIG. 2, when the second portion 120 is provided in one end portion or both end portions of the first portion 110, at least a part of the second portion 120, which has a cross-sectional area that is relatively wider than that of the first portion 110, may protrude with predetermined thicknesses t1 and t2 from an outer surface of the first portion 110 in a direction perpendicular to the longitudinal direction.

Consequently, at least parts of the outer surface of the first portion 110 and an outer surface of the second portion 120 may be formed as a step surface along the circumferential direction. When the conductive member 200 is wound on the first portion 110, a thickness of the conductive member 200 wound on the first portion 110 may be accommodated through the protruding thicknesses t1 and t2.

In this case, the first portion 110 and the second portion 120 which have different cross-sectional areas may be formed such that a central axis of the second portion 120 is aligned with that of the first portion 110 (see FIGS. 2, 4C, and 4E).

In the present invention, the central axes may be parallel to the longitudinal direction of the wireless power transfer antenna core 100 and may each be an imaginary straight line passing through the center of the wireless power transfer antenna core 100.

Accordingly, the second portion 120 may protrude with a predetermined thickness from the end portion of the first portion 110 with respect to the entire circumference thereof. When the cross-sectional shape of the first portion 110 is identical to that of the second portion 120, the thicknesses of the second portion 120 protruding from the surface of the first portion 110 may be equal to each other. In this case, the protruding thicknesses t1 and t2 of the second portion 120 protruding from the surface of the first portion 110 in the direction perpendicular to the central axis may be equal to or thicker than a line diameter of the conductive member 200.

Accordingly, the thickness of the conductive member 200 wound on the first portion 110 may be accommodated through the protruding thicknesses t1 and t2 of the second portion 120. That is, even though the overall thickness of the first portion 110 on which the conductive member 200 is wound is configured to be equal to a conventional thickness, the wireless power transfer antenna core 100 according to one embodiment of the present invention may enable efficient space utilization for winding the conductive member 200.

Further, it is possible to increase the thickness of the second portion 120 to correspond to at least the line diameter of the conductive member 200 in the second portion 120 on which the conductive member 200 is not wound such that an amount of a magnetic field induced to the conductive member 200 may be increased.

That is, when the wireless power transfer antenna core 100 according to one embodiment of the present invention is implemented as a wireless power transfer module, an amount of the magnetic field induced to the wireless power transfer antenna may be increased.

Figure 7A:
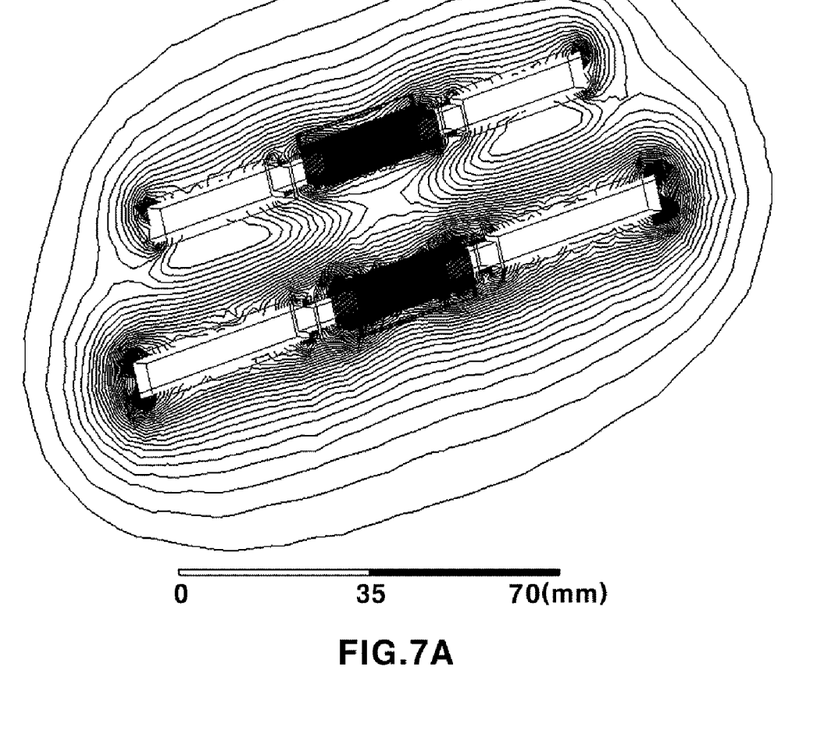
FIG. 7A is a diagram showing a magnetic field distribution between a wireless power receiving module implemented using the wireless power transfer antenna core according to one embodiment of the present invention and a general solenoid-type wireless power transmitting module.
Figure 7B:
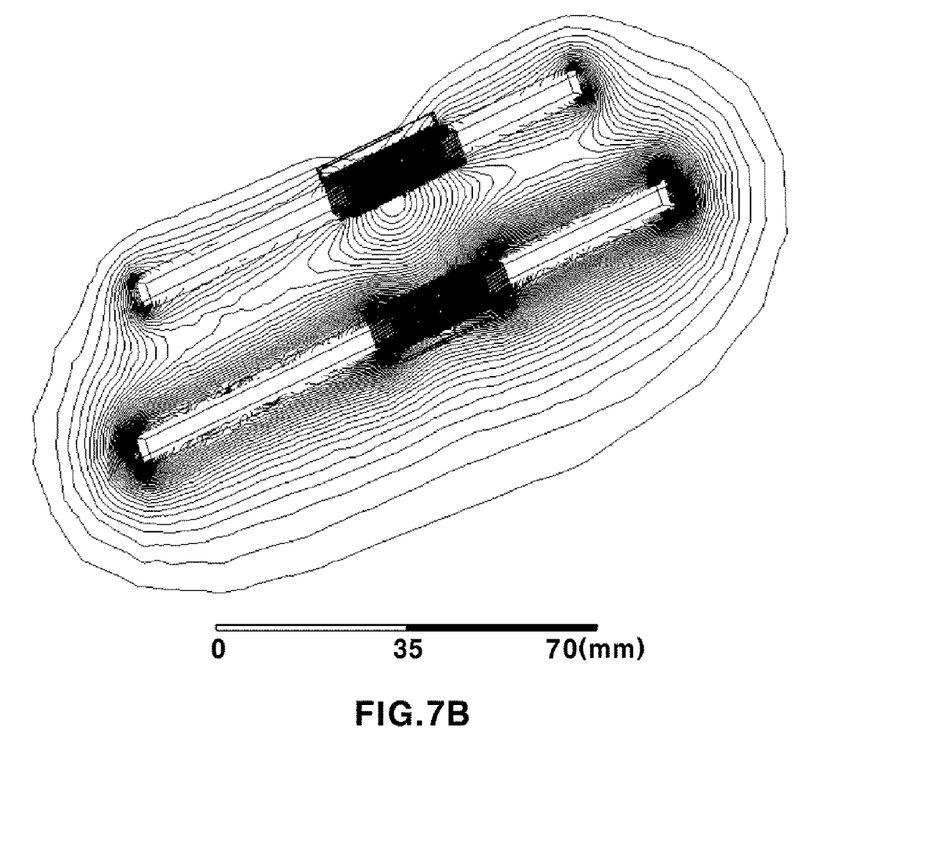
FIG. 7B is a diagram showing a magnetic field distribution between a general solenoid-type wireless power receiving module and a wireless power transmitting module, which employ antenna cores having the same cross-sectional area.

This can be confirmed from FIGS. 7A and 7B. FIG. 7A is a diagram showing a distribution of a magnetic field induced to the wireless power transfer antenna in a wireless power transmission system in the form in which the wireless power transfer antenna core 100 of the present invention is applied to both of a wireless power receiving module and a wireless power transmitting module, and FIG. 7B is a diagram showing a distribution of a magnetic field induced to a wireless power transfer antenna in a wireless power transmission system in the form in which a conventional wireless power transfer antenna core is applied to both of the wireless power receiving module and the wireless power transmitting module.

That is, it can be confirmed from FIGS. 7A and 7B that, in the wireless power transmission system in the form to which the wireless power transfer antenna core 100 of the present invention is applied, as compared to the wireless power transmission system to which the conventional wireless power transfer antenna core is applied under the same condition, an amount of a magnetic field induced to the wireless power transfer antenna is relatively large, and the magnetic field is generated in a wider range.

In other words, in the wireless power transmission system in the form to which the wireless power transfer antenna core 100 is applied, it can be confirmed that, since the amount of the magnetic field induced to the wireless power transfer antenna is larger than an amount of the magnetic field induced to the conventional wireless power transmission system, a larger magnetic field may be generated.

Consequently, even when the conductive member 200 is wound on the first portion 110 the number of turns which is equal to a conventional number of turns, the wireless power transfer antenna core 100 according to one embodiment of the present invention is able to increase a mutual inductance value as compared to the conventional antenna core such that transmission efficiency of wireless power may be increased.

Further, when the wireless power transfer module is implemented using the wireless power transfer antenna core 100 of the present invention, the thickness of the second portion 120 in which the conductive member 200 is not wound may be increased to correspond to at least a thickness corresponding to the line diameter of the conductive member 200. Thus, a distance from the antenna core of a solenoid-type wireless power receiving module or the antenna core of a solenoid-type wireless power transmitting module may be relatively reduced through the second portion 120.

Consequently, it is possible to increase a coupling coefficient between the wireless power receiving antenna and the wireless power transfer antenna which are implemented in the form of a coil, thereby improving the transmission efficiency of wireless power.

For example, when at least one of the wireless power receiving module and the wireless power transmitting module which are in the form of a solenoid type is implemented using the wireless power transfer antenna core 100 according to one embodiment of the present invention, as compared to both of a conventional solenoid-type wireless power receiving module and a conventional solenoid-type wireless power transmitting module which are implemented using an antenna core in a bar shape having the same cross-sectional area over the entire length thereof, even though the solenoid-type wireless power receiving module and the solenoid-type wireless power transmitting module are spaced in the same distance apart from each other, in the form to which the wireless power transfer antenna core 100 according to the present invention is applied, a distance between the antenna core of the wireless power receiving module and the antenna core of the wireless power transmitting module may be close to correspond to the protruding thicknesses t1 and t2 of the second portion 120.

That is, as compared to the wireless power transmission system to which the conventional wireless power transfer antenna core is applied, even when a distance between the wireless power receiving antenna and the wireless power transmitting antenna is the same in the wireless power transmission system to which the wireless power transfer antenna core 100 according to the present invention is applied, a distance between the wireless power transfer antenna cores 100 may be close through the protruding thicknesses of the second portion 120 as described above.

Consequently, it is possible to increase a coupling coefficient between the wireless power receiving antenna and the wireless power transmitting antenna which are implemented in the form of a coil, thereby improving the transmission efficiency of wireless power.

Figure 8A:
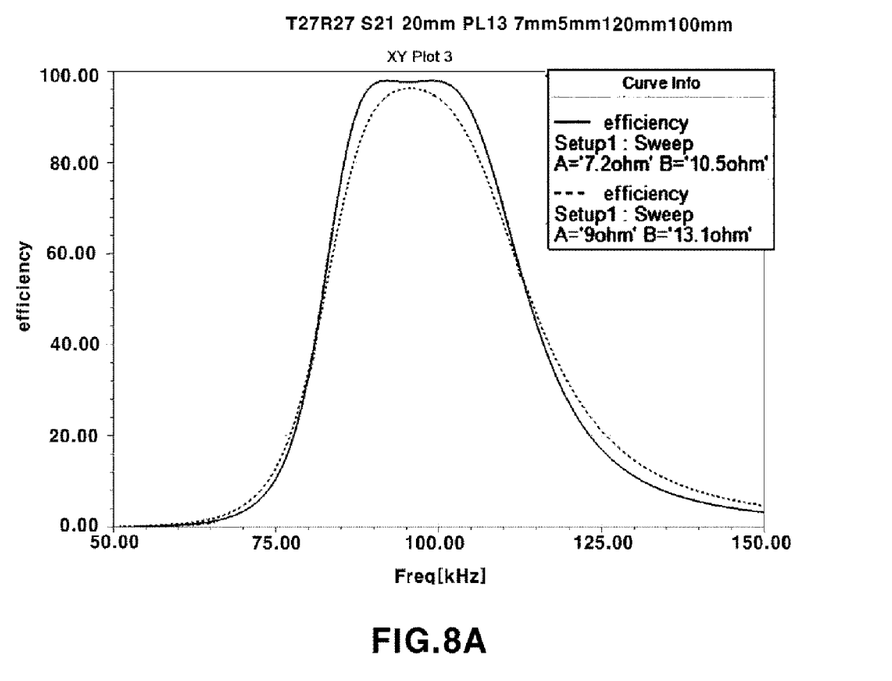
FIG. 8A is a graph showing power transmission efficiency of the wireless power receiving module implemented using the wireless power transfer antenna core according to one embodiment of the present invention.
Figure 8B:
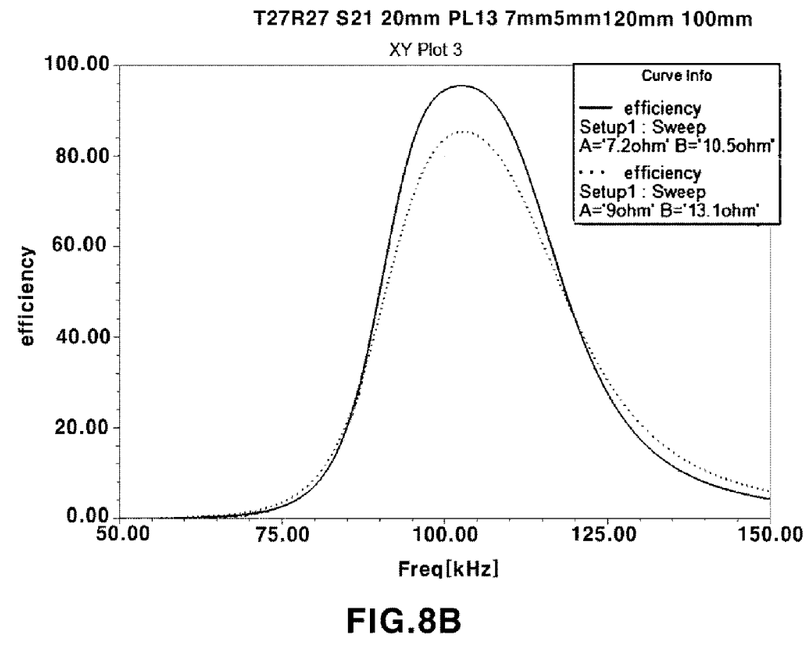
FIG. 8B is a graph showing transmission efficiency of a wireless power receiving module implemented using a general solenoid-type antenna core using an antenna core having the same cross-sectional area.

This can be confirmed from FIGS. 8A and 8B. FIG. 8A is a diagram showing transmission efficiency in a wireless power transmission system in the form in which the wireless power transfer antenna core 100 of the present invention is applied to both of the wireless power receiving module and the wireless power transmitting module, and FIG. 8B is a diagram showing transmission efficiency in a wireless power transmission system in the form in which the conventional wireless power transfer antenna core is applied to both of the wireless power receiving module and the wireless power transmitting module.

That is, it can be confirmed from FIGS. 8A and 8B that, in the wireless power transmission system in the form to which the wireless power transfer antenna core 100 of the present invention is applied, as compared to the wireless power transmission system to which the conventional wireless power transfer antenna core is applied under the same load condition, the transmission efficiency is high, and even when a variation in load occurs, transmission efficiency that is relatively higher than that of the conventional wireless power transmission system may be obtained. Further, it can be confirmed that, even when a frequency is varied, a section in which the transmission efficiency is kept constant or a section in which a fluctuation width is small is formed to be relatively wide as compared to the conventional wireless power transmission system such that the wireless power transmission system, to which the wireless power transfer antenna core 100 of the present invention is applied, stably implements high transmission efficiency.

Meanwhile, in the wireless power transfer antenna core 100 according to one embodiment of the present invention, the arrangement relationship between the first portion 110 and the second portion 120 is not limited to the above description, and the central axis of the second portion 120 may be connected to that of the first portion 110 so as to have a predetermined gap in an offset form (see FIGS. 4A, 4B, 4D, and 4F).

Further, an insulating layer (not shown) for preventing a short circuit with the conductive member 200 may be formed on the outer surface of the wireless power transfer antenna core 100 according to one embodiment of the present invention. The insulating layer may be formed on only the outer surface of the first portion 110 or may be formed on both of the first portion 110 and the second portion 120. Further, the insulating layer may be coated with an insulating material such as an epoxy resin or may be an insulating tape.

As described above, as shown in FIG. 5, the conductive member 200 having a predetermined line diameter may be wound multiple times on the first portion 110 in the form of a coil in the longitudinal direction, and thus the wireless power transfer antenna core 100 according to one embodiment of the present invention is implemented as the solenoid-type wireless power transfer module 1.

Here, it is noted that the conductive member 200 may serve as a wireless power transfer antenna for transmitting or receiving wireless power and may be operated in a magnetic resonance method in which power is transmitted between two LC circuits of which impedances are matched, and a usable frequency may be appropriately selected in the range of several tens of kHz to several tens of MHz. However, it is noted that an operation method of the conductive member 200 functioning as the wireless power transfer antenna is not limited to the above description, and the conductive member 200 may also serve as an antenna operated by a known magnetic induction method.

As a specific example, the wireless power transfer module 1 may be connected to a power source to serve as the wireless power transmitting module for transmitting wireless power, and the wireless power transfer module 1 may serve as the wireless power receiving module for receiving wireless power transmitted from the wireless power transmitting module. Further, the wireless power transfer antenna core 100 may further include circuitry such as a rectifier typically required for transmitting or receiving wireless power and other configurations.

As described above, when the wireless power transfer module 1 including the wireless power transfer antenna core 100 according to one embodiment of the present invention is implemented as the wireless power receiving module, the wireless power transfer module 1 may be included in an electronic device. Consequently, the electronic device may receive power in a wireless manner without using a power cable to be driven through the received power. For example, the electronic device may be home appliances such as a TV, a refrigerator, a cleaner, or a computer as well as a medical device, an industrial device, or the like which requires a power supply line.

Although the exemplary embodiments of the present invention have been described, the spirit of the present invention is not limited to the exemplary embodiments disclosed herein, and it should be understood that numerous other embodiments can be devised by those skilled in the art that will fall within the same spirit and scope of this disclosure through addition, modification, deletion, supplement, and the like of a component, and also these other embodiments will fall within the spirit and scope of the present invention.

The invention claimed is:

1. A wireless power transfer system comprising a wireless power receiving module and a wireless power transmitting module, wherein the wireless power receiving module comprises a first wireless power transfer antenna core in which a first conductive member configured to serve as an antenna for receiving wireless power is wound multiple times along a longitudinal direction of the first wireless power transfer antenna core, wherein the wireless power transmitting module comprises a second wireless power transfer antenna core in which a second conductive member configured to serve as an antenna for transmitting wireless power is wound multiple times along a longitudinal direction of the second wireless power transfer antenna core, wherein the first wireless power transfer antenna core and the second wireless power transfer antenna core each comprise:

a first portion having a first cross-sectional area; and a second portion extending with a predetermined length from an end portion of the first portion and a second cross-sectional area that is relatively larger than the first cross-sectional area, wherein the first wireless power transfer antenna core and the second wireless power transfer antenna core are each made of a magnetic body having a predetermined length, wherein the first conductive member and the second conductive member are wound multiple times on the first portion, wherein the first wireless power transfer antenna core and the second wireless power transfer antenna core are arranged in parallel to each other along the longitudinal direction of the first wireless power transfer antenna core, and wherein the first conductive member and the second conductive member are configured to generate magnetic resonance.

2. The wireless power transfer system of claim 1, wherein each of the first portion and the second portion has one cross-sectional shape selected from a circular shape, a polygonal shape, an elliptical shape, an arc shape, and a combination thereof.

3. The wireless power transfer system of claim 1, wherein the first portion has two end portions, and the second portion is formed to extend from both end portions of the first portion.

4. The wireless power transfer system of claim 1, wherein a central axis of the first portion and a central axis of the second portion are connected to be aligned with each other in the longitudinal direction of the first wireless power transfer antenna core.

5. The wireless power transfer system of claim 4, wherein the second portion is formed to allow a thickness protruding from an outer surface of the first portion in a direction perpendicular to the central axis to be equal to or thicker than a line diameter of the first conductive member.

6. The wireless power transfer system of claim 1, wherein the second portion is connected to the first portion such that a central axis of the second portion is offset with respect to a central axis of the first portion.

7. The wireless power transfer system of claim 1, wherein the magnetic body includes any one of a ferrite, a polymer and a ribbon sheet including at least of an amorphous alloy and a nanocrystalline alloy.

8. The wireless power transfer system of claim 1, further comprising an insulating layer formed on an outer surface of the first wireless power transfer antenna core and an outer surface of the second wireless power transfer antenna core.

9. The wireless power transfer system of claim 1, wherein the first conductive member and the second conductive member are wound on an entire length of the first portion or on a partial length thereof.

* * * * *